United States Patent
Kohen

(10) Patent No.: US 6,604,239 B1
(45) Date of Patent: Aug. 5, 2003

(54) SYSTEM AND METHOD FOR VIRTUAL TELEVISION PROGRAM RATING

(75) Inventor: Offer Kohen, Jaffa (IL)

(73) Assignee: Eyescene Inc., Wilmington, DE (US)

( * ) Notice: Subject to any disclaimer, the term of this patent is extended or adjusted under 35 U.S.C. 154(b) by 0 days.

(21) Appl. No.: 09/339,863

(22) Filed: Jun. 25, 1999

(51) Int. Cl.[7] .................... H04N 7/16; H04N 7/173; G06F 17/60; H04K 1/00; H04L 9/00
(52) U.S. Cl. .................... 725/13; 725/87; 725/135; 725/93; 725/29; 725/32; 705/27; 705/36; 705/38; 705/51; 705/52
(58) Field of Search .................... 705/10, 14, 35–37, 705/73, 51–52, 27, 38; 725/9, 13–14, 16, 24, 46, 86–87, 107.113, 135, 93, 29, 32

(56) References Cited

U.S. PATENT DOCUMENTS

| | | |
|---|---|---|
| 4,107,735 A | 8/1978 | Frohbach |
| 4,602,279 A | 7/1986 | Freeman |
| 4,926,255 A | 5/1990 | Von Kohorn |
| 5,034,807 A | 7/1991 | Von Kohorn |
| 5,036,389 A | 7/1991 | Morales |
| 5,223,924 A | 6/1993 | Strubbe |
| 5,270,922 A | 12/1993 | Higgins |
| 5,382,970 A | 1/1995 | Kiefl |
| 5,438,355 A | 8/1995 | Palmer |
| 5,453,015 A | 9/1995 | Vogel |
| 5,465,384 A | 11/1995 | Bejan et al. |
| 5,508,731 A | 4/1996 | Kohorn |
| 5,630,119 A | 5/1997 | Aristides et al. |
| 5,630,203 A | 5/1997 | Weinblatt |
| 5,636,346 A | 6/1997 | Saxe |
| 5,675,746 A * | 10/1997 | Marshall .................... 705/35 |
| 5,740,549 A | 4/1998 | Reilly et al. |
| 5,759,101 A | 6/1998 | Von Kohorn |
| 5,794,210 A | 8/1998 | Goldhaber |
| 5,798,785 A | 8/1998 | Hendricks et al. |
| 5,801,747 A | 9/1998 | Bedard |

(List continued on next page.)

OTHER PUBLICATIONS

"Hollywood Stock Exchange", Jun. 3, 2002. 3 pages. WEB Page: www.hsx.com/help/rules.htm "Hollywood Stock Exchange".

Primary Examiner—Chris Grant
Assistant Examiner—Hai V. Tran
(74) Attorney, Agent, or Firm—G. E. Ehrlich (1995) Ltd.

(57) ABSTRACT

A method and a system for combining at least two sources of television program rating information, including at least one source obtained through user input into an electronic interface, to provide a more accurate and focused rating for a particular television program. The source of rating information which is obtained through an electronic interface is preferably obtained through the active interaction of the user with a Web browser, for example through an applet or a Web page, or a combination thereof. The advantage of such active interaction is that the user wants to provide the rating information, thereby requiring more involvement by the user than merely passively viewing a television program. Such a system and method is also useful for rating advertisements, for which passive rating methods may not be as effective. Furthermore, more precise demographic information can be obtained through such an interaction with the Web browser, since the user can be requested to enter such precise information. Advertisers are interested in such demographic information, such that the system and method of the present invention may provide useful indicators of the interest of various groups of users in specific television programs. Television networks which schedule television programs are also interested in demographic information in order to be able to select television programs and to promote these television programs more effectively. Thus, the system and method of the present invention is useful for providing more accurate and specific rating information for television programs and advertisements, as well as for promoting these television programs and advertisements.

32 Claims, 2 Drawing Sheets

U.S. PATENT DOCUMENTS

| | | | |
|---|---|---|---|
| 5,809,483 | A | 9/1998 | Broka et al. |
| 5,850,218 | A | 12/1998 | Lajoie et al. |
| 5,903,635 | A | 5/1999 | Kaplan |
| 5,912,696 | A | 6/1999 | Buehl |
| 5,913,204 | A | 6/1999 | Kelly |
| 5,915,243 | A | 6/1999 | Smolen |
| 5,916,024 | A | 6/1999 | Von Kohorn |
| 5,926,801 | A | 7/1999 | Matsubara et al. |
| 5,929,850 | A | 7/1999 | Broadwin et al. |
| 5,933,811 | A | 8/1999 | Angles et al. |
| 5,950,176 | A * | 9/1999 | Keiser et al. ............ 705/37 |
| 5,973,683 | A | 10/1999 | Cragun et al. |
| 5,974,299 | A | 10/1999 | Massetti |
| 5,991,735 | A * | 11/1999 | Gerace .................. 705/10 |
| 6,005,561 | A | 12/1999 | Hawkins et al. |
| 6,005,565 | A | 12/1999 | Legall et al. |
| 6,029,195 | A * | 2/2000 | Herz .................. 725/116 |
| 6,081,830 | A | 6/2000 | Schindler |
| 6,088,731 | A | 7/2000 | Kiraly et al. |
| 6,112,053 | A | 8/2000 | Dunki-Jacobs et al. |
| 6,134,535 | A | 10/2000 | Belzberg |
| 6,151,059 | A | 11/2000 | Schein et al. |
| 6,160,989 | A | 12/2000 | Hendricks et al. |
| 6,172,677 | B1 | 1/2001 | Stautner |

* cited by examiner

SYSTEM AND METHOD FOR VIRTUAL TELEVISION PROGRAM RATING

FIELD AND BACKGROUND OF THE INVENTION

The present invention relates to a system and method for virtual television program rating, and in particular, to a system and method for enabling participation of a plurality of users to rate television programs through an electronic interface, in conjunction with at least one additional source of television program rating information.

The rating of television programs is both inexact and yet highly commercially important. The rating of a program, or the number of viewers watching a particular program, is important for determining advertising revenue which can be charged for that program. Demographic analysis of such rating information is also important, since a program which is intended for children would presumably include advertisements for toys and other items of interest to children, while a television program which is intended for older adults might include advertisements for automobiles and household products, for example. Demographic analysis is used to determine which types of viewers are actually watching a particular program, since a program for children may also be viewed by their caregivers, for example. Such analysis in turn is useful for both determining advertising revenues and the types of advertisements which should be shown to viewers of these television programs.

However, as noted previously, actually determining these television ratings is very inexact. Currently available methods include the "Nielsen box" of the Nielsen™ rating system (Nielsen Media Research). This "box" is an electronic device which is connected to the television set of a sampled cross-section of television viewers and which detects the television program being watched. Such detection is then used in order to determine the ratings. Other methods include surveys of television viewers. Unfortunately, all of these methods are inexact, as they do not necessarily measure who is watching a particular program, nor do they determine whether a particular program is being actively watched or is merely "background noise". Furthermore, these methods are less suitable for rating advertisements themselves, or even to determine whether such advertisements have the attention of the viewers. Finally, these methods are passive, in that they cannot be used to actively promote a particular television program.

One attempt to provide an active method for rating movies is disclosed as the "Hollywood Stock Exchange™" (http://www.hsx.com as of Apr. 20, 1999), which enables users to buy virtual "stocks" in movies. The price for such virtual stocks is set only according to the estimate of the users as to the gross sales of tickets for the movie before the movie is released, and only according to actual gross sales after the movie is released. Therefore, such a method does not combine at least two sources of rating information in order to determine how much each virtual stock is worth. Furthermore, such a method would not be useful for television programs, which are recurrent and which usually are shown periodically throughout a television season. Thus, the disclosed method is both generally deficient and is also particularly unsuitable for rating television programs.

A more useful system and method would provide an independent measure of the rating for a particular television program, as well as independent demographic analysis of the audience for the program. Such a system and method would preferably combine at least two sources of television program rating information, including at least one source obtained through user input into an electronic interface such as a Web browser which would be indicative of the interest of the user in a particular television program, thereby potentially increasing the accuracy of such television program ratings. Such a system and method would also be suitable for determining the level of viewer interest in an advertisement. In addition, such a system and method would also be useful for actually promoting a particular television program. Unfortunately, such a system and method are not currently available.

There is thus a need for, and it would be useful to have, a system and a method for rating a television program which combines at least two different sources of rating information, including at least one source obtained through user input into an electronic interface such as a Web browser, which would also be useful for determining the interest of viewers in advertisements and which could also be used for promoting television programs.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

Figure 1:
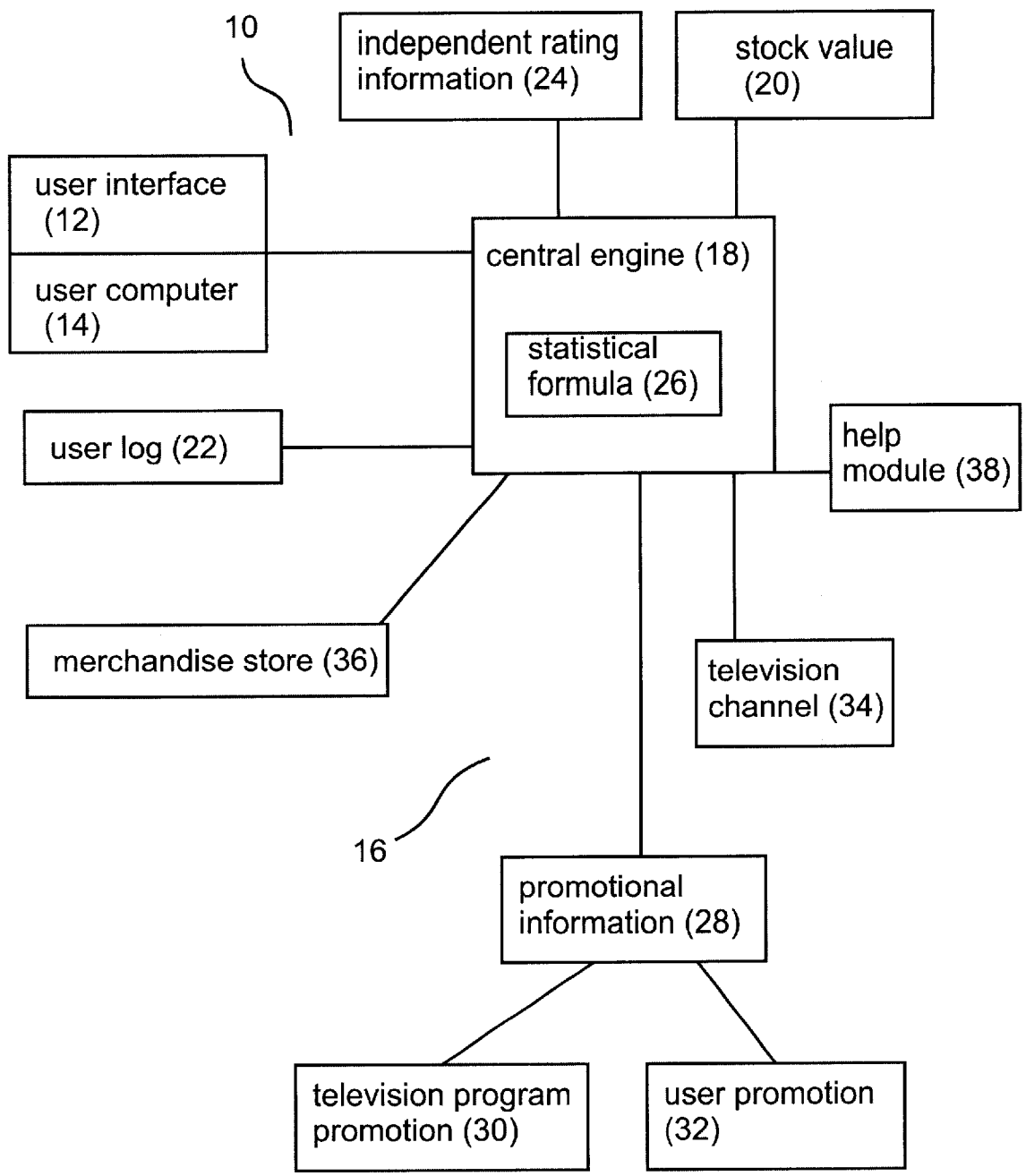
FIG. 1 is a schematic block diagram of an overall system according to the present invention.

The present invention is of a method and a system for combining at least two sources of television program rating information, including at least one source obtained through user input into an electronic interface, to provide a more accurate and focused rating for a particular television program. The user input into an electronic interface is preferably embodied as an interactive game, in which the user "invests" in television-related features by purchasing "virtual stocks" in particular television programs, advertisements, and/or actresses and actors with "virtual money". Since the user is interested in playing the game, the interactive activities optionally provide opportunities for either indirectly assessing the interests of the user and/or for displaying promotional information to the user.

Preferably, the other source of rating information is taken from an actual rating source such as from Nielsen Media Research, for example, while the source obtained through user input into an electronic interface is optionally and preferably calculated as an interest rating extracted from the investments of the layers in particular television programs, advertisements, and/or actors or actresses, for example.

According to the present invention, there is provided a system for rating a television program as a virtual stock by a user, the system comprising: (a) a user log module for storing an amount of the virtual stock owned by the user and for storing an amount of a virtual currency for purchasing the virtual stock; (b) a user interface for displaying the amount of the virtual stock and the amount of the virtual currency to the user; (c) a television program stock value module for storing a price of the virtual stock, the price of the virtual stock determining the rating; (d) an independent rating information module for providing independent rating information about the television program; and (e) a central engine connected to the independent rating module, the television program stock value module and the user interface, for receiving an order from the user for the virtual stock, for determining the amount of the virtual stock and the amount of the virtual currency in the user log, and for combining the independent rating information and a number of orders for the virtual stock to determine the price of the virtual stock.

According to another embodiment of the present invention, there is provided a method for rating a television program as a virtual stock by a user, the virtual stock having a value, the value corresponding to a rating for the television program, the method comprising the steps of: (a) registering the user; (b) receiving a predetermined amount of virtual currency by the user; (c) logging in by the user; (d) viewing an amount of virtual currency and an amount of virtual stocks owned by the user; (e) placing an order for at least one virtual stock; (f) adjusting the amount of the virtual currency and the amount of virtual stocks according to the order; (g) receiving independent rating information for the television program; and (h) calculating the value of the virtual stock from the independent rating information and a number of orders for the virtual stock.

Hereinafter, the term "Web browser" refers to any software program which can display text, graphics, video, sound or other multimedia information, other information, or a combination thereof, from Web pages on World Wide Web sites, or any other UI (user interface). The Web browser is preferably able to operate a program written in the Java or JavaScript programming languages. The term "Web browser" also includes any software application which extracts any amount of data in one or more types of media from HTML (hypertext mark-up language) and/or other World Wide Web-based information, including text, images, audio (streaming or downloaded), video (streaming or downloaded), 3D environments (VRML (virtual reality modeling language), MetaStream or others), or any other type of media content present on or through the World Wide Web or the Internet, as well as future extensions and modifications to these technologies.

Hereinafter, the term "Web page" refers to any document written in a mark-up language including, but not limited to, HTML (hypertext mark-up language) or VRML (virtual reality modeling language), dynamic HTML, XML (extended mark-up language) or related computer languages thereof, or to technologies such as Flash™ technology or that provided by Shockwave™, or any other interactive technology providing duplex two-way information streaming between the GUI of the user and a central system engine, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group. Hereinafter, the term "Web server" refers to a computer or other electronic device which is capable of serving at least one Web page to a Web browser.

Hereinafter, the term "applet" refers to a self-contained software module written in an applet language such as Java or constructed as an Active™ control.

Hereinafter, the term "computer" indicates any type of electronic device which is capable of performing computations, including, but not limited to, personal computers (PC) having an operating system such as DOS, Windows™, OS/2™ or Linux; Macintosh™ computers; computers having JAVA™-OS or BeOS™ as the operating system; thin client computers; "Web TV" electronic devices which combine a television set with at least a partial set of computational functions, preferably including the display of Web pages; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, or any other handheld device, portable device for data processing such as a PDA (personal data assistant), or embedded system or device; or any other known and available operating system and computational device. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (USA).

Hereinafter, the term "display screen" refers to an electronic device which is capable of displaying a GUI (graphical user interface) to a user, including but not limited to a television set, and a monitor or other display device associated with any of the previously described computers.

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

Hereinafter, the terms "computer user" and "user" both refer to the person who operates the Web browser or other GUI interface and navigates through the system of the present invention by operating a computer.

The method of the present invention could also be described as a plurality of instructions being performed by a data processor, such that the method of the present invention could be implemented as hardware, software, firmware or a combination thereof. For the present invention, a software application could be written in substantially any suitable programming language, which could easily be selected by one of ordinary skill in the art. The programming language chosen should be compatible with the computer according to which the software application is executed. Examples of suitable programming languages include, but are not limited to, C, C++ and Java.

DETAILED DESCRIPTION OF THE INVENTION

The present invention is of a method and a system for combining at least two sources of television program rating information, including at least one source obtained through user input into an electronic interface, to provide a more accurate and focused rating for a particular television program. The present invention is preferably implemented as an interactive game, in the user "invests" in television-related features by purchasing "virtual stocks" in particular television programs, advertisements, and/or actresses and actors with "virtual money".

Preferably, the other source of rating information is taken from an actual rating source such as from Nielsen Media Research, for example, while the source obtained through user input into an electronic interface is optionally and preferably calculated as an interest rating extracted from the investments of the players in particular television programs, advertisements, and/or actors or actresses, for example.

The source of rating information which is obtained through an electronic interface is more preferably obtained through the active interaction of the user with a Web browser, for example through an applet or a Web page, or a combination thereof, which is preferably embodied in the present invention as a game. The advantage of such active interaction with a game is that the user wants to play the game and enjoys this interactive activity, thereby requiring more involvement by the user than merely passively viewing a television program. In turn, the activities of the user through investing in the virtual stocks provide part of the rating information for the rating method of the present invention. Such a system and method is also useful for rating advertisements, for which passive rating methods may not be as effective.

Furthermore, more precise demographic information can be obtained through such an interaction with the Web browser, both because the user can be requested to enter such precise information and particularly because the interactive game of the present invention enables information to be gathered from the user during the process of buying and selling the "virtual stocks", as well as through interactions with optional promotional activities. Advertisers are interested in such demographic information, such that the system and method of the present invention may provide useful indicators of the interest of various groups of users in specific television programs. Television networks which schedule television programs are also interested in demographic information in order to be able to select television programs and to promote these television programs more effectively. Thus, the system and method of the present invention is useful for providing more accurate and specific rating information for television programs and advertisements, as well as for promoting these television programs and advertisements.

The principles and operation of a system and a method according to the present invention may be better understood with reference to the drawings and the accompanying description, it being understood that these drawings are given for illustrative purposes only and are not meant to be limiting.

Referring now to the drawings, FIG. 1 is a schematic block diagram of an overall system according to the present invention. A system 10 features an electronic user interface 12, through which the user interacts with system 10. User interface 12 could be a Web browser, displaying a Web page and/or an applet, for example. Alternatively, user interface 12 could be a dedicated client software program, preferably with a GUI (graphical user interface). User interface 12 is operated by a user computer 14, which could substantially any type of computer as previously described. Optionally, user computer 14 could be a dedicated electronic device for the operation of user interface 12, for example as a publicly available kiosk.

User computer 14 is connected to a server computer 16, which again could be substantially any type of suitable computer as previously described, or even a combination of two or more such computers. Server computer 16 preferably operates a number of software modules according to the present invention. Alternatively, as previously described, these software modules could also be implemented as firmware, hardware or a combination thereof. It should be noted that these modules are described only as separate functional entities for the purposes of clarity, and that these modules could be combined into a single software program, or firmware or hardware device, for example.

A central engine module 18 receives information from the other modules and performs any necessary analyses or calculations, as described in greater detail below. In particular, central engine module 18 manages a television program stock value module 20, which includes all of the values for different television programs, each of which is represented by a particular "virtual stock". The value for a particular television program virtual stock is preferably calculated according to a combination of at least two independent sources of rating information, as described in greater detail below. Such a value for the virtual stock is also, in effect, a type of rating for the television program itself. Preferably, the user is required to hold a minimum number of different types of virtual stocks at all times, such as at least fifteen to twenty stocks for example.

Optionally and preferably, other types of virtual stocks include those representing advertisements, actors and actresses, and/or "group stocks". These group stocks are traded through a particular type of "buy" or "sell" orders, in which investments are bought and sold in all members of the group. For example, a user can invest in global NBC stocks, which in turn will be treated as investing in all television programs broadcast by the NBC television broadcasting company, with a different risk factor and a stock value which is dependent on the stock values for the individual television programs which compose the group.

Central engine module 18 receives orders for buying or selling these virtual stocks from the user through user interface 12 and user computer 14. Preferably, different types of stock orders are possible. For example, the user could request that the order could be executed immediately. Alternatively and preferably, the user could request that the order only be executed if the stock has a certain value, for example that the stock be at, or below, a certain value for "buy" orders. Other types of stock orders are described in greater detail with regard to FIG. 2.

Preferably, the currency which is exchanged as a result of these orders is a virtual currency, which only has value within system 10. As described in greater detail in FIG. 2, the user is preferably given a certain amount of virtual currency when first interacting with system 10 through user interface 12. The amount of this virtual currency which is owned by the user is preferably stored in a user log 22. This amount is then either debited or credited, for "buy" or "sell" orders, respectively. In addition, preferably the names and amounts of the virtual stocks which are owned by the user are also stored in user log 22. More preferably, the user can view the contents of user log 22 through user interface 12.

Optionally and preferably, the values for each television program virtual stock, or hence the ratings for each television program, are displayed to the user through user interface 12. Preferably, these values are displayed continuously during the operation of user interface 12. Alternatively, these values are displayed intermittently, preferably at least upon user request through user interface 12, although these values could also be displayed periodically without such a request. More preferably, these values are displayed in the form of a "ticker tape" at one portion of user interface 12, which simulates the ticker tape display used to show information for actual stocks in actual stock markets.

Central engine module 18 also receives user information from the user through user interface 12 and user computer 14. This user information preferably includes personal information about the user, such as the age and gender of the user, the occupation of the user and the salary range of the user. Of course, optionally other and/or substitute user information could be requested. This user information is optionally and preferably gathered for demographic analysis of the users by central engine module 18 in order to provide a demographic profile of these users.

Central engine 18 also determines the values of the virtual stocks by combining at least two separate sources of rating information. One source of rating information is determined according to the number of "buy" or "sell" orders placed for a particular virtual stock. A second source of rating information is preferably an independent source provided through independent rating information module 24. By "independent", it is meant that the source is outside of, and hence independent of, system 10. More preferably, this independent source is a regular source of television program rating information, such as that available from Nielsen Media Research Inc. or other rating companies.

Preferably, the step of combining these sources of rating information is performed according to a statistical formula module 26, which determines the relative weight of each type of rating information in the final calculation. Optionally, this statistical formula is adjusted for different types of virtual stocks. For example, an advertisement may not have an independent rating, such that the value of the virtual stock would depend entirely upon the "buy" and "sell" orders. Also optionally, individual television actors and actresses could also be associated with virtual stocks, which also may not have an independent rating. The final calculated value is then provided to central engine 18.

Optional but preferred features of system 10 include a promotional information module 28. Promotional information module 28 preferably includes various games, quizzes and other interactive activities for the user to operate through user interface 12. These activities can optionally be used to gather additional user information, and to promote new and existing television programs, advertisements, actors and actresses. In addition, preferably these activities are used to gather user feedback about proposed, newly launched and/or existing television programs. In order to encourage the user to perform these activities, optionally and more preferably, various prizes and other rewards are offered to the user.

In addition, more preferably promotional information module 28 provides chat and discussion forums which enable different users to interact and to communicate with each other, as well as to discuss their favorite television programs, actors and actresses for example.

Promotional information module 28 optionally and preferably includes two types of promotional information: promotional information for each television program, provided through a television program promotional module 30; and promotional information for system 10, provided through a user promotional module 32.

Television program promotional module 30 optionally and preferably provides such information as details of previous episodes of a particular television program; selected details of future episodes, provided as "sneak previews"; gossip and other information about the actors and actresses in a particular television program; and "behind the scenes" information about the production of various television programs. In addition, television program promotional module 30 optionally and more preferably provides such information in the form of graphics, audio and video clips, in particular to obtain user feedback about new advertisements and television programs.

Television program promotional module 32 is preferably presented to the user in the form of an information center for television programs. This center preferably includes an archive of detailed information on programs, advertisements, production issues, actors and a lot of related information, through which the user can browse to receive real-time, or close to real-time, updated information on the television programs, advertisements, actors and actresses, and virtual stocks of interest. For example, the information could be presented through a series of Web pages, optionally and preferably supported with applets and other browser-related technologies, which would enable the user through browse through a series of hyper-links in order to obtain the information of interest. Of course, system 10 could also optionally be instructed to control the presentation of this information to the user, such that particular television programs could be promoted for example.

User promotional module 32 promotes system 10 to the user, for example by awarding prizes as previously described; by rating the performance of users according to the amount of virtual currency and/or virtual stock in user log 22, or according to the biggest gain in virtual currency and/or virtual stock in user log 22, for example.

Other optional but preferred features of system 10 include a television channel module 34 for enabling the user to view entire television programs. Television channel module 34 is preferably provided when user computer 14 is implemented as Web TV, for reasons of bandwidth. Television channel module 34 would enable system 10 to interface to the entire television viewing experience of the user, and to act as a gateway for such viewing. Optionally and preferably, central engine 18 would measure the period of time that a particular television program was displayed through television channel module 34.

The viewing choices of the user could also optionally and more preferably be used for the collection of more accurate statistical and demographic information concerning television programs, since the precise length of time any television program is being viewed could be determined. In addition, the identity of the user who is watching the television program could also optionally be more precisely determined, since the user would have preferably entered a password or other user identifying information in order to access the game of the present invention. Thus, Web TV is a preferred platform for the operation of the system and method of the present invention.

Also optionally and preferably, a merchandise store module 36 is provided to enable the user to purchase merchandise related to television programs. More preferably, prizes in the form of discounts can be used to purchase such merchandise at a reduced price. Also more preferably, the, virtual currency can be "spent" at merchandise store module 36 in order to obtain free or reduced price merchandise.

In addition, optionally and preferably a help module 38 is provided in order to help the user through user interface 12. Help module 38 is able to explain the rules and regulations of system 10. Optionally and preferably, help module 38 interacts with the user in the form of an animated virtual character, who is able to "speak" to the user, either through an audio or video stream, and/or through still text or graphics.

Figure 2:
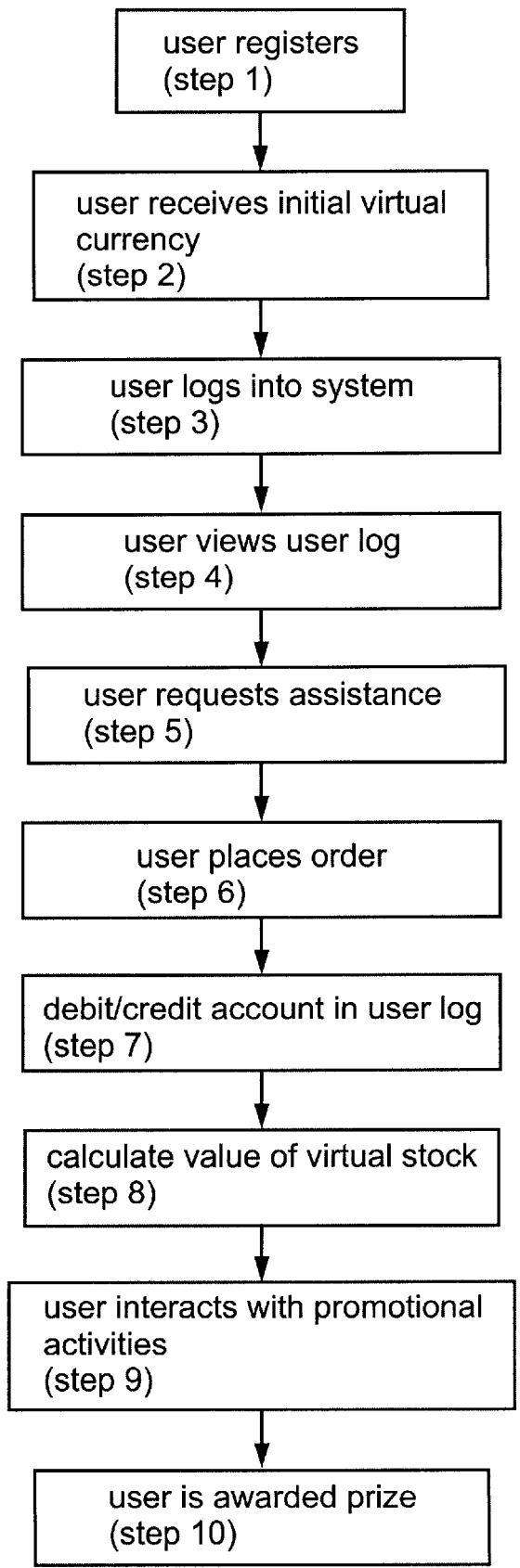
FIG. 2 is a flowchart of a method according to the present invention.

FIG. 2 shows a flowchart for describing the method according to the present invention. In step 1, the user registers with the system for the first time. Such registration preferably involves the steps of entering a user name and a user password. More preferably, registration includes the step of entering an e-mail (electronic mail) address for the user. Other optional user information which could be entered includes, but is not limited to, personal information about the user, such as the age and gender of the user, the occupation of the user and the salary range of the user.

In step 2, the registered user receives a predetermined amount of virtual currency, which can be used to buy television program virtual stocks as described in greater detail below.

In step 3, the user logs into the system, preferably by providing a user name and/or user password. It should be noted that steps 1 and 2 are only performed the first time that the user interacts with the system of the present invention, such that the process would optionally begin with step 3 if such registration had been previously performed. However, also optionally, the user could enter the personal information for registration when there is a change in any of the user information which was previously provided to the system Next, in step 4, the user views the user log, in order to determine how much virtual currency is available in the virtual currency account, and how many virtual stocks have been bought and are now stored in the user log. Optionally and preferably, the user also views the value of at least one virtual stock. Also optionally and preferably, in step 5 the user requests help from the system. It should be noted that such help preferably can be requested at any time during the interaction of the user with the system.

In step 6, the user places an order to buy or sell a particular stock or stocks. Preferably, this step could be implemented in a number of different ways. For example, the user could request that the order is executed immediately. Alternatively and preferably, the user could request that the order only be executed if the stock has a certain value, for example that the stock be at, or below, a certain value for "buy" orders. The user could preferably also request that the stock be at, or above, a certain rating value for "sell" orders. The user could preferably also request that the order be executed at a certain time, for example at the end of the day, or only after the particular television program has been shown again.

After the order has been executed, the virtual currency account of the user is debited or credited, according to the type of order, in step 7. Preferably, the user is not allowed to spend more virtual currency to buy stocks than the amount of currency which is available in the user log, and cannot sell more virtual stocks than those which are held in the user log. Optionally, the virtual currency account of the user is charged a "transaction fee" for each order, in order to prevent spurious trading or malicious attempts to disrupt the functioning of the system.

In step 8, the system calculates the value of each virtual stock for each television program. Preferably, this step is performed by combining at least two separate sources of rating information. One source of rating information is determined according to the number of "buy" or "sell" orders placed for a particular virtual stock. A second source of rating information is preferably an independent source, which more preferably is a regular source of television program rating information, such as that available from Nielsen Media Research Inc. or other rating companies.

Preferably, the step of combining these sources of rating information is performed according to a statistical formula, which determines the relative eight of each type of rating information in the final calculation. Optionally, his statistical formula is adjusted for different types of virtual stocks.

In step 9, the user optionally interacts with various promotional activities, for example for promoting a particular television program, actor or actress, and/or for promoting the system itself. In step 10, preferably the user is awarded a prize for performing such interactions.

The method of the present invention is particularly suitable for implementation as a business method embodied in software, in that the game is a useful commercial tool. For example, as noted previously, the user is optionally and preferably exposed to promotional information through promotional activities. The user is preferably encouraged to participate in these activities by being awarded prizes. Therefore, the user has an incentive to receive such commercially important information, which could be used to promote a television program, for example. In addition, optionally and preferably, the system of the present invention is able to gather statistical and demographic information about the users with regard to both the television programs and with regard to information about the users themselves, which is also commercially important. Thus, the method of the present invention is a useful business method, which would preferably include the steps of: buying and/or selling virtual stocks as previously described; displaying information about the status of the user on the GUI of the system of the present invention; exposing the user to promotional information through this GUI; and extracting statistical and demographic information about the user during such exposure to promotional information.

Another embodiment of the present invention is the implementation of the method and system of the present invention with Web TV or other interactive television technologies. The term "Web TV" generally refers to interactive television, in which the user interacts with the television screen rather than simply passively viewing the television program. Web TV is a particularly preferred embodiment for implementing both the system and the method of the present invention. The game of the present invention is particularly suitable for Web TV, since the GUI of the game could provide a seamless interface for operation of Web TV. For example, the user could select and view television programs through the GUI of the system of the present invention when implemented with Web TV. In addition, the user could also optionally and preferably create a viewing package of a plurality of television programs which are of interest. The game of the present invention could therefore act as a portal to the television programs, since the user could play the game and at the same time watch the television programs, thereby providing the user with interactive Web TV.

The game is preferably implemented with several interactive television technologies for enriching the experience of the user. For example, the PIP (picture-in-picture) technology could be used to display a "picture" container within another "picture" container. Each container would hold and display video, audio, text and other types of media, such that the user would be presented with a full UI (user interface) which could then be manipulated and/or customized as desired. In the context of the game, the user could view the television program while simultaneously interacting with the game of the present invention. For example, the user could request information about a particular television program and then watch the program itself while examining the information. The PIP technology also enables other types of interactive television technologies to be incorporated within the game of the present invention, such as VOD (video-on-demand) and RP (remote programming), as described in greater detail below. The user is thus provided with more options for customizing and adjusting the UI, and hence interactions with the game of the present invention, such that these interactions can be measured, analyzed and processed for more accurate statistical and demographic data collection.

The second useful type of interactive television technology, VOD, enables premium and/or pay-per-view television programs to be delivered to the user upon request.

The user can request a particular program and then receive it for an individual viewing experience, such that requested television programs are directed to those who are interested in viewing them. In addition, VOD enables the system and method of the present invention to collect more information on the preferences of the user and on other aspects of the viewing habits of the user, such as the time of day that the television programs are viewed, the length of viewing, the general preferred type of television program, and other user information. Such user information can then be used to extract useful statistical and demographic information by the system of the present invention, which is commercially important data to collect, particularly in conjunction with other information about the user which is supplied from other aspects of the game of the present invention.

The third type of useful interactive television technology is RP, which enables the user to construct a preferred viewing schedule for the television programs. Such a schedule can optionally be constructed entirely according to the requests of the user, although optionally the system could add further programming and/or information where required to fill any gaps in the schedule. For example, the system could add commercial advertisements, promotional campaign video, audio or text data, or any other type of media content which the system wishes to promote to the user. All of this media content is optionally selected according to the profile of the user which is obtained from the other interactive technologies described previously, and optionally and preferably also from the interaction by the user with the game of the present invention.

RP is also optionally employed in conjunction with additional hardware devices, such as computers, VCR's and PDA's to enable the user to receive personalized information, television programs, and other types of media content. The RP technology itself optionally and preferably instructs the hardware device to perform certain actions, such as recording a particular television program or receiving stock market or other information, for example.

Interactive television also enables the user to enter direct input into the system and method of the present invention, such that all of the activities of the user within the system can be recorded and/or optionally processed directly in real time. Thus, the total viewing experience and interaction of the user with the game of the present invention can be examined, analyzed and recorded.

It will be appreciated that the above descriptions are intended only to serve as examples, and that many other embodiments are possible within the spirit and the scope of the present invention.

What is claimed is:

1. A system for rating a television program as a virtual stock by a user, the system comprising:
   (a) a user log module for storing an amount of the virtual stock owned by the user and for storing an amount of a virtual currency for purchasing the virtual stock;
   (b) a user interface for displaying said amount of the virtual stock and said amount of said virtual currency to the user;
   (c) a television program stock value module for storing a price of the virtual stock, said price of the virtual stock determining the rating;
   (d) an independent rating information module for providing independent rating information about the television program; and
   (e) a central engine connected to said independent rating module, said television program stock value module and said user interface, for receiving an order from the user for the virtual stock, for determining said amount of the virtual stock and said amount of said virtual currency in said user log, and for combining said independent rating information and a number of orders for the virtual stock to determine said price of the virtual stock.

2. The system of claim 1, wherein said independent rating information is obtained from a regular television program rating provider.

3. The system of claim 2, wherein said central engine further comprises: a statistical formula module for combining said independent rating information and said number of orders for the virtual stock according to a weighting function.

4. The system of claim 1, wherein said user interface is a Web browser.

5. The system of claim 4, wherein said Web browser displays a GUI (graphical user interface) selected from the group consisting of a Web page and an applet.

6. The system of claim 5, further comprising:
   (f) a Web TV device for operating said user interface, said Web TV device being connected to said central engine.

7. The system of claim 6, further comprising:
   (g) a television channel for displaying at least one television program on said Web TV device, said television channel being connected to said central engine, such that said central engine measures a period of time for displaying said at least one television program.

8. The system of claim 4, further comprising:
   (f) a help module for providing assistance to the user through said Web browser.

9. The system of claim 8, wherein said assistance is provided through an animated character displayed on said Web browser.

10. The system of claim 1, further comprising:
    (f) a promotional information module connected to said central engine for displaying promotional information to the user through said user interface.

11. The system of claim 10, wherein said promotional information includes at least one interactive activity for interaction with the user through said user interface.

12. The system of claim 11, wherein the user receives a prize for performing said at least one interactive activity, said prize being stored in said user log.

13. The system of claim 12, further comprising:
    (g) a merchandise store module for providing merchandise for purchase by the user according to a merchandise price, such that the user receives a reduction in said merchandise price according to said prize.

14. The system of claim 11, wherein said at least one interactive activity is a game.

15. The system of claim 10, wherein said promotional information module further comprises a television program promotional module for providing promotional information about the television program.

16. The system of claim 10, wherein said promotional information module further comprises a user promotional module for providing promotional information about the system.

17. The system of claim 1, further comprising:
    (f) a merchandise store module for providing merchandise for purchase by the user according to a merchandise price, such that the user receives a reduction in said merchandise price according to at least a portion of said amount of said virtual currency.

18. A method for rating a television program as a virtual stock by a user, the virtual stock having a value, the value corresponding to a rating for the television program, the method comprising the steps of:

(a) registering the user;

(b) receiving a predetermined amount of virtual currency by the user;

(c) logging in by the user;

(d) viewing an amount of virtual currency and an amount of virtual stocks owned by the user;

(e) placing an order for at least one virtual stock;

(f) adjusting said amount of said virtual currency and said amount of virtual stocks according to said order;

(g) receiving independent rating information for the television program; and (h) calculating the value of the virtual stock from said independent rating information and a number of orders for the virtual stock.

19. The method of claim 18, wherein the user is required to purchase a minimum number of virtual stocks.

20. The method of claim 18, wherein step (a) further comprises the step of:

(i) entering a user name and a user password.

21. The method of claim 20, wherein step (a) further comprises the steps of:

(ii) entering an e-mail (electronic mail) address for the user; and (iii) entering personal information about the user selected from the group consisting of age and gender of the user, occupation of the user and salary range of the user.

22. The method of claim 18, wherein step (d) further comprises the step of requesting help by the user.

23. The method of claim 18, wherein step (e) further comprises the step of viewing a value of at least one virtual stock.

24. The method of claim 23, wherein step (e) includes the step of buying the virtual stock.

25. The method of claim 24, wherein step (e) further includes the step of requesting that the step of buying the virtual stock is performed only if said value of the virtual stock is at or below a predetermined amount.

26. The method of claim 23, wherein step (e) includes the step of selling the virtual stock.

27. The method of claim 26, wherein step (e) further includes the step of requesting that the step of seling the virtual stock is performed only if said value of the virtual stock is at or above a predetermined amount.

28. The method of claim 26, wherein step (e) further comprises the step of subtracting a transaction fee from said amount of virtual currency for each order.

29. The method of claim 23, wherein step (e) is executed immediately.

30. The method of claim 23, wherein step (e) is executed after the television program corresponding to the virtual stock has been shown.

31. The method of claim 18, wherein the step of combining these sources of rating information is performed according to a statistical formula for determining relative weight of said independent rating information and said number of orders for the virtual stock.

32. The method of claim 18, further comprising the steps of:

(i) interacting with a promotional activity by the user; and (j) receiving a prize for performing step (I).

* * * * *